(12) United States Patent
Landolt et al.

(10) Patent No.: US 11,769,889 B2
(45) Date of Patent: Sep. 26, 2023

(54) HYDROGEN STORAGE SYSTEM AND AIRCRAFT COMPRISING A HYDROGEN STORAGE SYSTEM

(71) Applicants: Airbus SAS, Blagnac (FR); Airbus Operations SAS, Toulouse (FR)

(72) Inventors: Jonathan Landolt, Blagnac (FR); Olivier Raspati, Toulouse (FR)

(73) Assignees: AIRBUS SAS, Blagnac (FR); AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 17/691,395

(22) Filed: Mar. 10, 2022

(65) Prior Publication Data
US 2022/0302477 A1    Sep. 22, 2022

(30) Foreign Application Priority Data
Mar. 17, 2021  (FR) ...................................... 2102637

(51) Int. Cl.
| | |
|---|---|
| *B64D 27/24* | (2006.01) |
| *B64D 37/30* | (2006.01) |
| *B60L 50/70* | (2019.01) |
| *H01M 8/04089* | (2016.01) |
| *H01M 8/04082* | (2016.01) |

(52) U.S. Cl.
CPC ......... *H01M 8/04089* (2013.01); *B60L 50/70* (2019.02); *B64D 27/24* (2013.01); *B64D 37/30* (2013.01); *H01M 8/04201* (2013.01); *B60L 2200/10* (2013.01); *H01M 2250/20* (2013.01)

(58) Field of Classification Search
CPC ..... B64D 37/30; B64D 2221/00; B64D 27/24
See application file for complete search history.

(56) References Cited

U.S. PATENT DOCUMENTS

| | | | |
|---|---|---|---|
| 2014/0295305 A1 | 10/2014 | Wake et al. | |
| 2016/0159492 A1* | 6/2016 | Filangi, Jr. ............. | B64D 41/00 244/58 |
| 2017/0170494 A1 | 6/2017 | Lents et al. | |
| 2017/0233111 A1* | 8/2017 | Mata ................. | H01M 8/04208 244/171.1 |

(Continued)

FOREIGN PATENT DOCUMENTS

| | | |
|---|---|---|
| DE | 102014205394 A1 | 10/2014 |
| EP | 3182490 A1 | 6/2017 |

(Continued)

OTHER PUBLICATIONS

French Search Report; priority document.

*Primary Examiner* — Philip J Bonzell
*Assistant Examiner* — Justin Michael Heston
(74) *Attorney, Agent, or Firm* — Greer, Burns & Crain, Ltd.

(57) ABSTRACT

A hydrogen storage system comprises a hydrogen tank and a system for controlling hydrogen evaporation in the hydrogen tank. This control system comprises a hydrogen discharge pipe connected to the hydrogen tank, on the one hand, and to a controllable valve, on the other hand, as well as a processing unit configured to control the valve as a function of the pressure in the tank. The hydrogen storage system further comprises a fuel cell permanently connected to the hydrogen tank and the processing unit being electrically powered by the fuel cell.

11 Claims, 7 Drawing Sheets

(56) References Cited

U.S. PATENT DOCUMENTS

| | | | |
|---|---|---|---|
| 2018/0134401 A1* | 5/2018 | Halsey | H01M 8/2495 |
| 2020/0185744 A1 | 6/2020 | Ito et al. | |
| 2021/0078719 A1 | 3/2021 | Thomas et al. | |
| 2021/0207538 A1* | 7/2021 | O'Flarity | F02M 21/0206 |
| 2021/0207540 A1* | 7/2021 | Roberge | F02C 7/22 |

FOREIGN PATENT DOCUMENTS

| | | | |
|---|---|---|---|
| EP | 3228546 A1 * | 10/2017 | B64F 1/34 |
| FR | 3097202 A1 | 12/2020 | |
| WO | 2015104487 A1 | 7/2015 | |

* cited by examiner

HYDROGEN STORAGE SYSTEM AND AIRCRAFT COMPRISING A HYDROGEN STORAGE SYSTEM

CROSS-REFERENCES TO RELATED APPLICATIONS

This application claims the benefit of the French patent application No. 2102637 filed on Mar. 17, 2021, the entire disclosures of which are incorporated herein by way of reference.

FIELD OF THE INVENTION

The invention relates to the field of hydrogen storage and more specifically relates to its application to aircraft using an electric propulsion system powered with energy by hydrogen. Such a system requires the installation of a liquid hydrogen tank on board the aircraft allowing hydrogen to be supplied to fuel cells or a hydrogen combustion propulsion engine. In order to remain in the liquid state in the tank, the hydrogen must be kept at a very low temperature of approximately −253° C. To this end, the hydrogen tank is provided with very efficient thermal insulation. However, despite this thermal insulation, some of the hydrogen will evaporate in the tank. When hydrogen originating from the tank is used to ensure the operation of the aircraft, in particular its propulsion, this evaporation phenomenon is not an issue since the hydrogen evaporated thus is used on board the aircraft, for example, to power fuel cells or a hydrogen combustion engine. However, when the aircraft is parked on the ground, the fuel cells or the hydrogen combustion engine are no longer used to operate the aircraft and therefore they no longer consume hydrogen. As a result, the pressure in the tank increases due to the aforementioned hydrogen evaporation phenomenon. However, in order to guarantee the integrity of the tank and to prevent it from exploding, the pressure inside the tank needs to be limited to a pressure value that is lower than a maximum pressure value, for example, approximately 850 bar.

One solution to this problem, envisaged by the inventors, would involve installing a pressure monitoring system in the tank, which would control the opening of a valve when the pressure in the tank is too high, so as to release some of the hydrogen gas contained in the tank into the atmosphere, so as to allow the pressure in the tank to decrease. However, in order to operate, this monitoring system must be powered by energy, for example, by electricity, yet the aircraft can no longer be electrically powered by the fuel cells used for the propulsion of the aircraft, since these fuel cells are shutdown when the aircraft is parked on the ground. A first solution could involve powering this monitoring system by means of a battery. However, this solution would be difficult to implement safely, as it would require ensuring that the battery capacity would allow the monitoring system to be powered as long as the hydrogen tank was not empty. A second solution could involve powering the monitoring system by means of a ground-based electrical source, for example, a "ground power unit" at the airport where the aircraft is parked. However, this solution would make the aircraft dependent on the means available on the ground, which could lead to situations that are difficult to manage if an airport does not have a suitable electrical source.

SUMMARY OF THE INVENTION

A particular aim of the present invention is to provide a solution to this problem. The solution relates to a hydrogen storage system comprising a hydrogen tank and a system for controlling hydrogen evaporation in the hydrogen tank, the control system comprising:
  a hydrogen discharge pipe connected to the hydrogen tank, on the one hand, and to a controllable valve, on the other hand; and
  a processing unit configured to control the valve as a function of the pressure in the tank, so as to ensure that the value of the pressure inside the hydrogen tank does not exceed a first predetermined pressure threshold.

The hydrogen storage system is noteworthy in that it further comprises a fuel cell permanently connected to the hydrogen tank so as to permanently generate electricity as long as hydrogen remains in the tank and in that the processing unit is electrically powered by the fuel cell.

Thus, given that the fuel cell is permanently connected to the hydrogen tank, the fuel cell is permanently supplied with hydrogen as long as hydrogen remains in the tank. Consequently, as long as hydrogen remains in the tank, the fuel cell generates electricity that allows the processing unit to be electrically powered. This allows the hydrogen evaporation control system to be powered autonomously and thus ensures that it operates as long as hydrogen remains in the tank. In addition, consuming hydrogen originating from the tank in order to power the fuel cell increases the time before depressurization of the tank, by controlling the valve, is required.

In one embodiment, the hydrogen discharge pipe is at least slightly different from a pipe connecting the fuel cell to the hydrogen tank. In particular, the controllable valve does not form part of a hydrogen supply circuit of the fuel cell. Advantageously, a first end of the discharge pipe is connected to the hydrogen tank and a second end of the discharge pipe is provided for discharging hydrogen originating from the hydrogen tank into the environment when the controllable valve is open, with the controllable valve being installed in series on the discharge pipe, between its first end and its second end. The invention also relates to an aircraft comprising a hydrogen storage system as stated above.

According to various embodiments that can be taken individually or in combination:
  the aircraft comprises a propulsion system powered with energy by the hydrogen originating from the hydrogen storage system;
  the propulsion system comprises an engine operating by the combustion of hydrogen originating from the hydrogen storage system;
  the propulsion system comprises an electric motor electrically powered by a fuel cell assembly supplied with hydrogen by the hydrogen storage system;
  the fuel cell of the hydrogen storage system forms part of the fuel cell assembly electrically powering the electric motor;
  the fuel cell of the hydrogen storage system is independent of the fuel cell assembly electrically powering the electric motor;
  the aircraft comprises an electrical circuit configured to electrically power the electric motor via the fuel cell of the hydrogen storage system, in addition to the electrical power supply to the motor via the fuel cell assembly;
  the aircraft further comprises, on the one hand, a non-propulsive system normally supplied with electricity by an on-board electrical source of the aircraft, called main electrical source, independent of the fuel cell of the hydrogen storage system and of the fuel cell assembly, and, on the other hand, an electrical circuit configured to electrically power the non-propulsive system via the fuel cell of the hydrogen storage system in the event of a failure of the main electrical source, in particular when the aircraft is in flight;

the aircraft comprises an electrical system separate from the processing unit, as well as an electrical circuit configured to electrically power this electrical system via the fuel cell of the hydrogen storage system when the aircraft is parked on the ground;

the electrical system corresponds to a heating system for at least one of the fuel cells of the fuel cell assembly;

the aircraft comprises an electrical circuit configured to allow an external electrical system to be connected to the aircraft when the aircraft is parked on the ground, and to electrically power this electrical system via the fuel cell of the hydrogen storage system.

The invention also relates to an assembly comprising an aircraft and a hydrogen storage system as stated above, wherein the hydrogen tank is installed on board the aircraft and the fuel cell of the hydrogen storage system is installed in a unit outside the aircraft that is intended to be connected to the aircraft by a detachable hydrogen pipe and by a detachable electrical connection.

BRIEF DESCRIPTION OF THE DRAWINGS

The invention will be better understood from reading the following description and with reference to the accompanying figures.

DETAILED DESCRIPTION OF THE PREFERRED EMBODIMENTS

Figure 1:
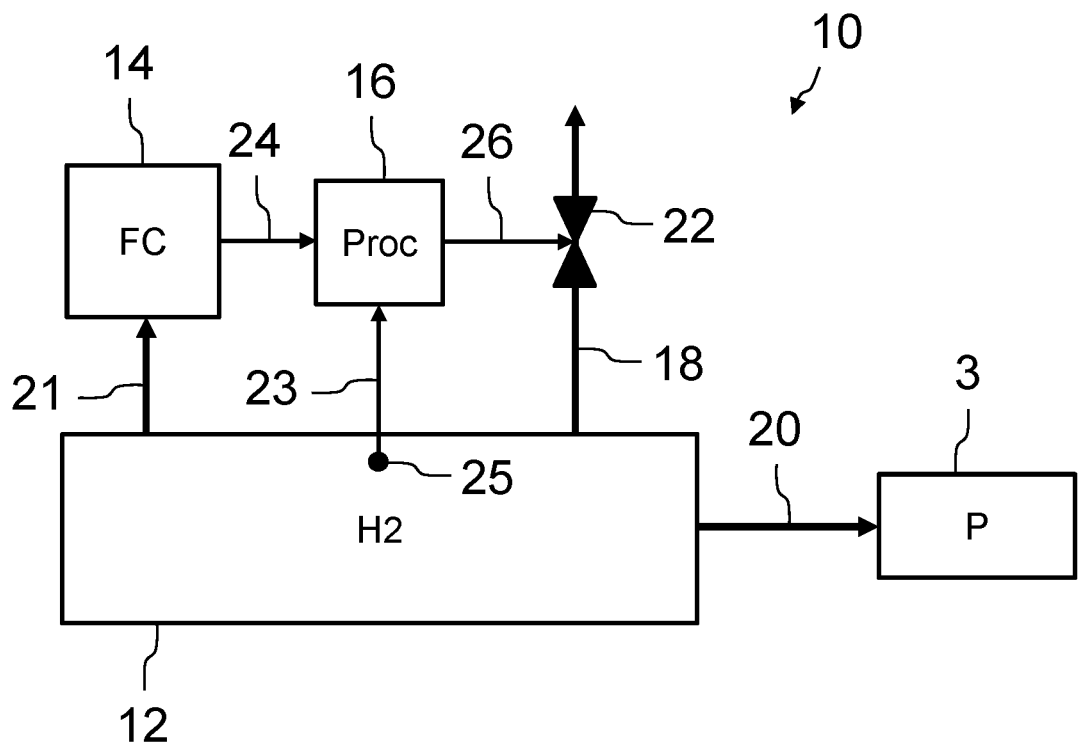
FIG. 1 schematically illustrates a hydrogen storage system according to one embodiment of the invention.

The hydrogen storage system 10 shown in FIG. 1 comprises a hydrogen tank 12 (denoted "H2" in the figure), a fuel cell 14 (denoted "FC" in the figure), a processing unit or controller 16 (denoted "Proc" in the figure), as well as a pipe 18, on which a controllable valve 22 is mounted in series. A first end of the pipe 18 is connected to the hydrogen tank 12. A second end of the pipe 18 is provided for discharging hydrogen originating from the hydrogen tank 12 into the atmosphere when the valve 22 is open. The fuel cell 14 is permanently connected to the hydrogen tank 12 by a pipe 21, so that electricity can be generated by the fuel cell 14 as long as the tank 12 contains hydrogen. The processing unit 16 is connected to the fuel cell 14 by an electrical circuit 24 provided to allow the processing unit 16 to be electrically powered by the fuel cell 14. The processing unit 16 is also connected as output to a control input of the valve 22 by a link 26, so as to allow the processing unit 16 to control the opening or closing of the valve 22. Advantageously, the processing unit 16 is also connected as input to a pressure sensor 25 by a link 23. The pressure sensor 25 is installed so as to allow the pressure of the hydrogen in the hydrogen tank 12 to be measured. According to a first alternative embodiment, the pressure sensor 25 is installed in the hydrogen tank 12. According to another alternative embodiment, the pressure sensor 25 is installed in a hydrogen pipe connected to the hydrogen tank. The processing unit 16 comprises a microprocessor or a microcontroller, for example.

Figure 2:
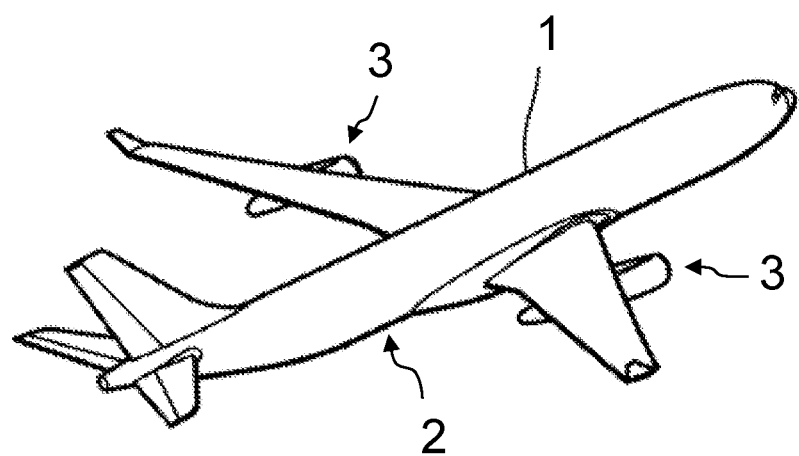
FIG. 2 illustrates an aircraft equipped with a hydrogen storage system.

In a particular embodiment, the hydrogen tank 12 is installed on board an aircraft, such as the aircraft 1 shown in FIG. 2. The hydrogen tank 12 is then connected, for example, to an aircraft propulsion system 3 by a pipe 20, in such a way that the propulsion system 3 is supplied with energy by hydrogen originating from the tank 12.

The hydrogen storage system operates as follows. As long as the hydrogen tank 12 contains hydrogen, the fuel cell 14 receives hydrogen originating from the tank via the pipe 21 in such a way that the fuel cell permanently produces electricity. Therefore, the processing unit 16, which is electrically connected to the fuel cell 14 via the electrical circuit 24, is permanently electrically powered as long as the hydrogen tank 12 contains hydrogen. This ensures the operation of the processing unit 16 as long as the hydrogen tank 12 contains hydrogen. The processing unit 16 controls the opening or closing of the valve 22 as a function of the pressure inside the hydrogen tank 12. In one embodiment, the processing unit controls the opening of the valve 22 when the pressure is greater than or equal to a first predetermined pressure threshold and it controls the closure of the valve when the pressure is less than or equal to a second predetermined pressure threshold, lower than the first pressure threshold. Thus, when the pressure inside the tank reaches the first predetermined pressure threshold due to the evaporation of hydrogen in the tank, opening the valve 22 allows part of the hydrogen contained in the tank in gaseous form to be discharged via the pipe 18. This part of the hydrogen is thus discharged into the atmosphere, which allows the pressure in the hydrogen tank to be decreased. The pressure in the tank thus decreases until it reaches, downwardly, the second predetermined pressure threshold. The processing unit 16 then controls the closure of the valve 22 so as to stop discharging hydrogen into the atmosphere. This operation ensures that the value of the pressure inside the hydrogen tank does not exceed the first predetermined pressure threshold. To this end, the processing unit uses, for example, a pressure value that is acquired from the pressure sensor 25 as the pressure value. Preferably, the processing unit repeatedly monitors the pressure, for example, at a period of approximately 1 second. The value of the first pressure threshold is selected, for example, from the 5 bar to 25 bar range, for example, 10 bar, and the value of the second pressure threshold is selected, for example, from the 5 bar to 10 bar range, for example, 5 bar.

In one embodiment, when the hydrogen storage system 10 is connected to the propulsion system 3, the propulsion system 3 comprises an engine operated by the combustion of hydrogen originating from the hydrogen storage system 10 via the pipe 20.

Figure 3:
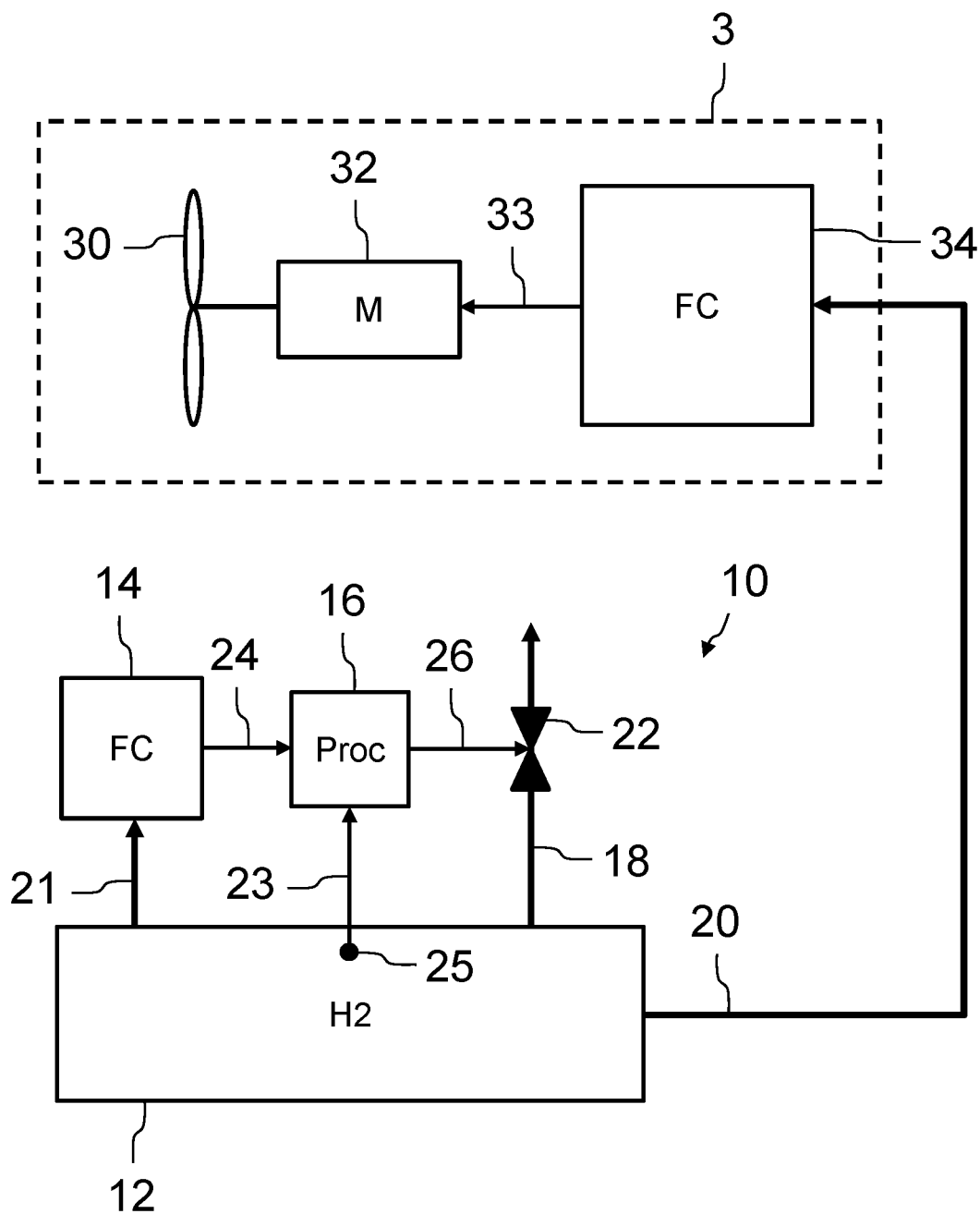
FIG. 3 schematically illustrates a hydrogen storage system according to one embodiment of the invention, connected to an aircraft propulsion system.

In another embodiment illustrated in FIG. 3, the propulsion system 3 comprises a fuel cell assembly 34, electrically connected, via a set of electrical links 33, to at least one electric motor 32. A propulsion propeller 30 is mechanically coupled to the electric motor 32. The fuel cells of the fuel cell assembly 34 are connected as input to the hydrogen storage system 10 via the pipe 20. The propulsion system 3 further comprises a controller, not shown in FIG. 3. To enable operation of the propulsion system 3, the controller controls the supply of hydrogen to the fuel cells of the fuel cell assembly 34, for example, by controlling the opening of a valve mounted in series on the pipe 20. The fuel cells then generate electricity, thus allowing the motor 32 to be electrically powered, which then sets the propulsion propeller 30 into rotation.

Figure 4:
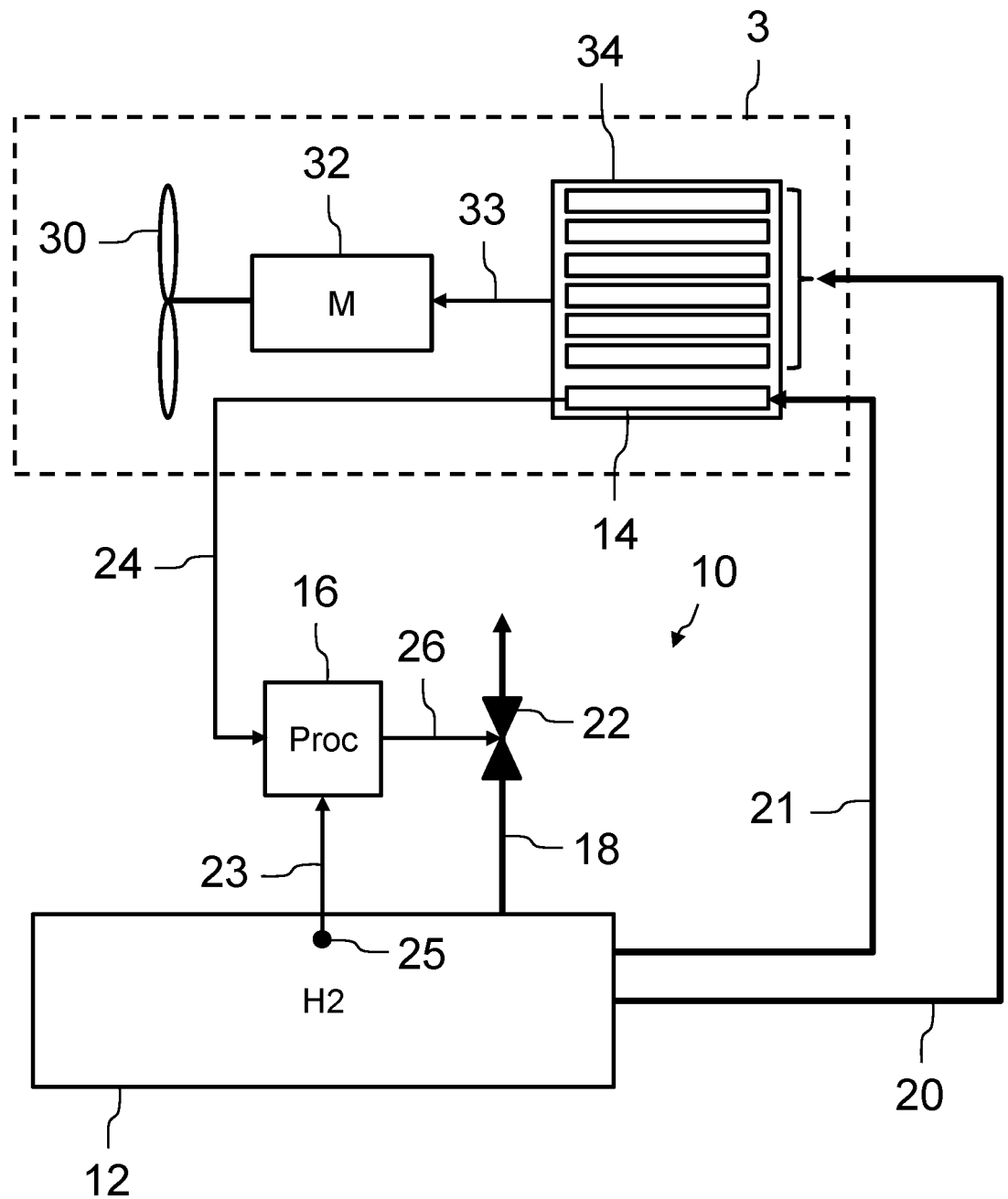
FIG. 4 illustrates an alternative embodiment of the hydrogen storage system connected to the aircraft propulsion system.

In an alternative embodiment illustrated in FIG. 4, the fuel cell 14 of the hydrogen storage system forms part of the fuel cell assembly 34 electrically powering the electric motor 32. As in the embodiment illustrated in FIG. 3, the fuel cell 14 is permanently connected to the hydrogen tank by the pipe 21. The other fuel cells of the fuel cell assembly 34 are supplied with hydrogen via the pipe 20. This hydrogen supply is controlled by the controller of the propulsion system 3, as previously indicated. An electrical output from the fuel cell 14 electrically powers the processing unit 16 via the electrical link 24.

Figure 5:
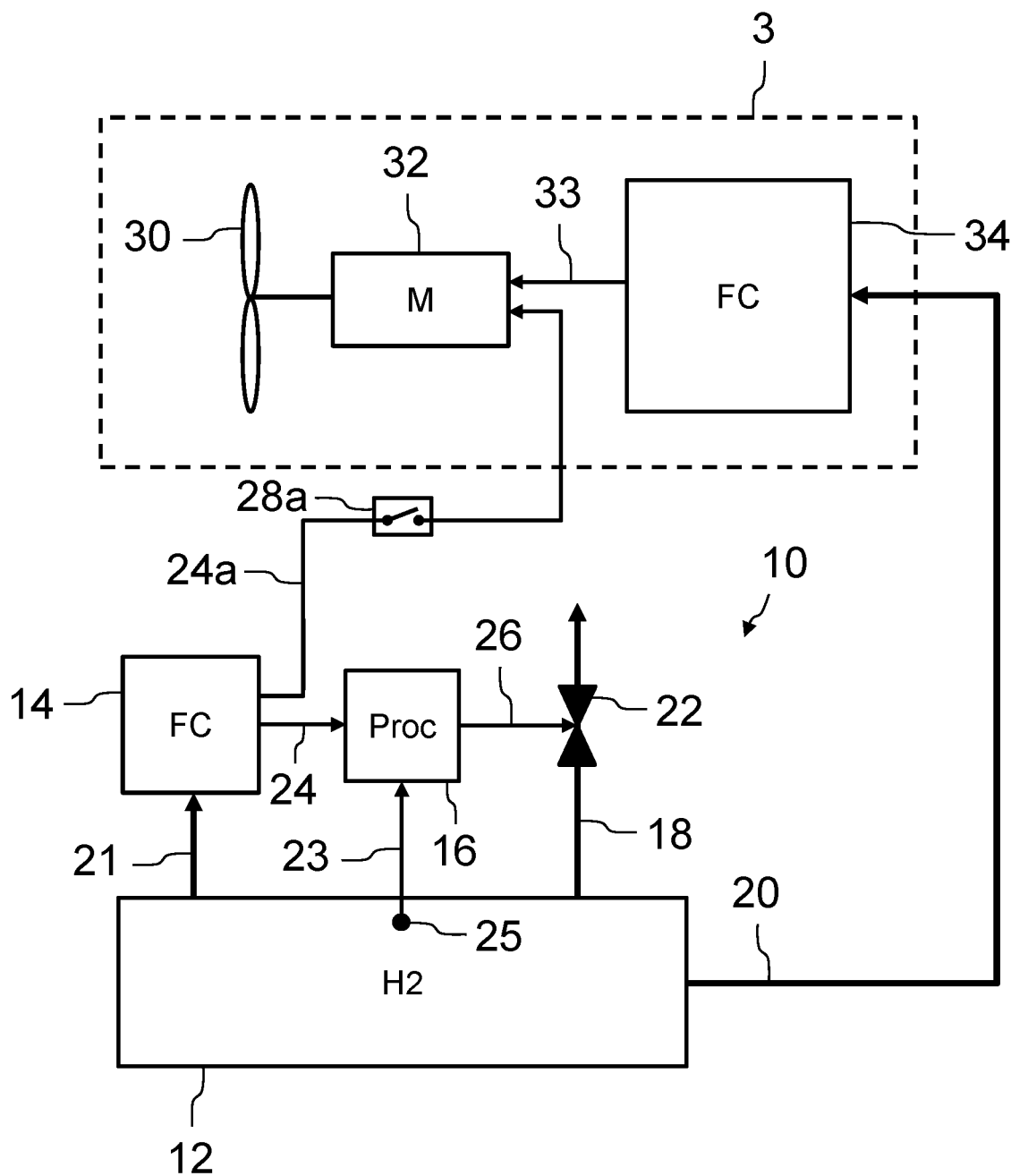
FIG. 5 schematically illustrates a particular embodiment of the hydrogen storage system connected to the aircraft propulsion system.

In particular, the aircraft comprises an electrical circuit configured to electrically power the electric motor 32 via the fuel cell 14 of the hydrogen storage system 10, in addition to the electrical power to the motor via the fuel cell assembly 34. In an example illustrated in FIG. 5, this electrical circuit comprises an electrical link 24a, as well as a contactor 28a mounted in series on this electrical link. A first end of the electrical link 24a is connected to an electrical output of the fuel cell 14 and a second end of the electrical link is connected to the electric motor 32 or to a controller of the motor. The contactor 28a is controlled by the controller of the propulsion system 3. For example, the controller controls the closure of the contactor 28a during operating phases of the propulsion system 3 requiring high propulsion power, in particular during the take-off of the aircraft. This avoids over-sizing the fuel cell assembly 34 to allow for a one-off supply of maximum power during the take-off of the aircraft.

Figure 6:
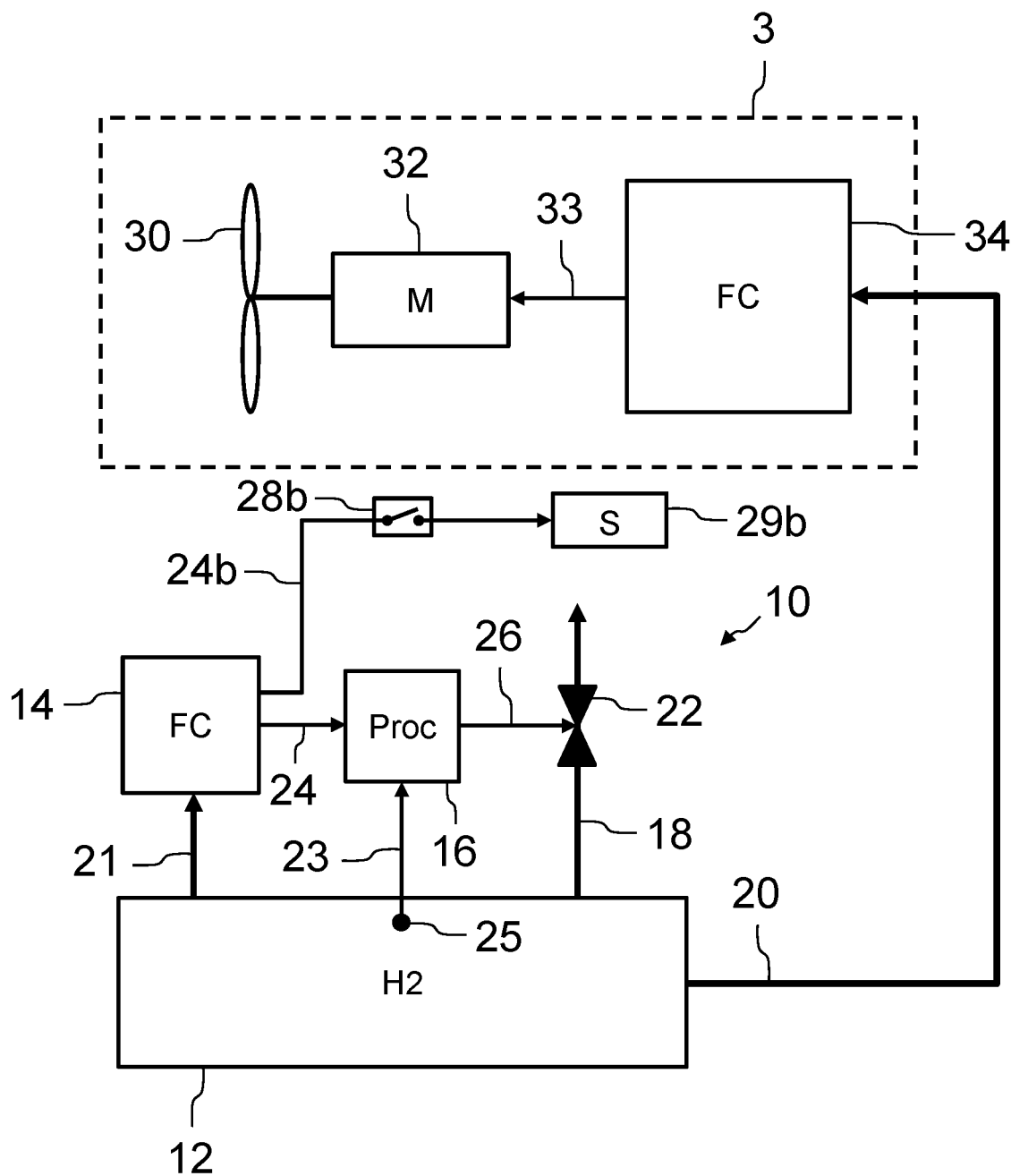
FIG. 6 schematically illustrates another particular embodiment of the hydrogen storage system connected to the aircraft propulsion system.

In a further particular manner, as shown in FIG. 6, the aircraft further comprises a non-propulsive system 29b (denoted S in the figure) normally supplied with electricity by an electrical source on board the aircraft (not shown in the figure), called main electrical source, independent of the fuel cell 14 of the hydrogen storage system and the fuel cell assembly 34. The aircraft also comprises an electrical circuit configured to electrically power the non-propulsive system 29b via the fuel cell 14 of the hydrogen storage system 10 in the event of a failure of the main electrical source, in particular when the aircraft is in flight. This electrical circuit comprises an electrical link 24b between an electrical output of the fuel cell 14 and the non-propulsive system 29b, as well as a contactor 28b mounted in series on this electrical link. The contactor 28b is controlled, for example, by an electrical core (not shown) of the aircraft, so as to close the contactor in the event of a failure of the main electrical source.

Figure 7:
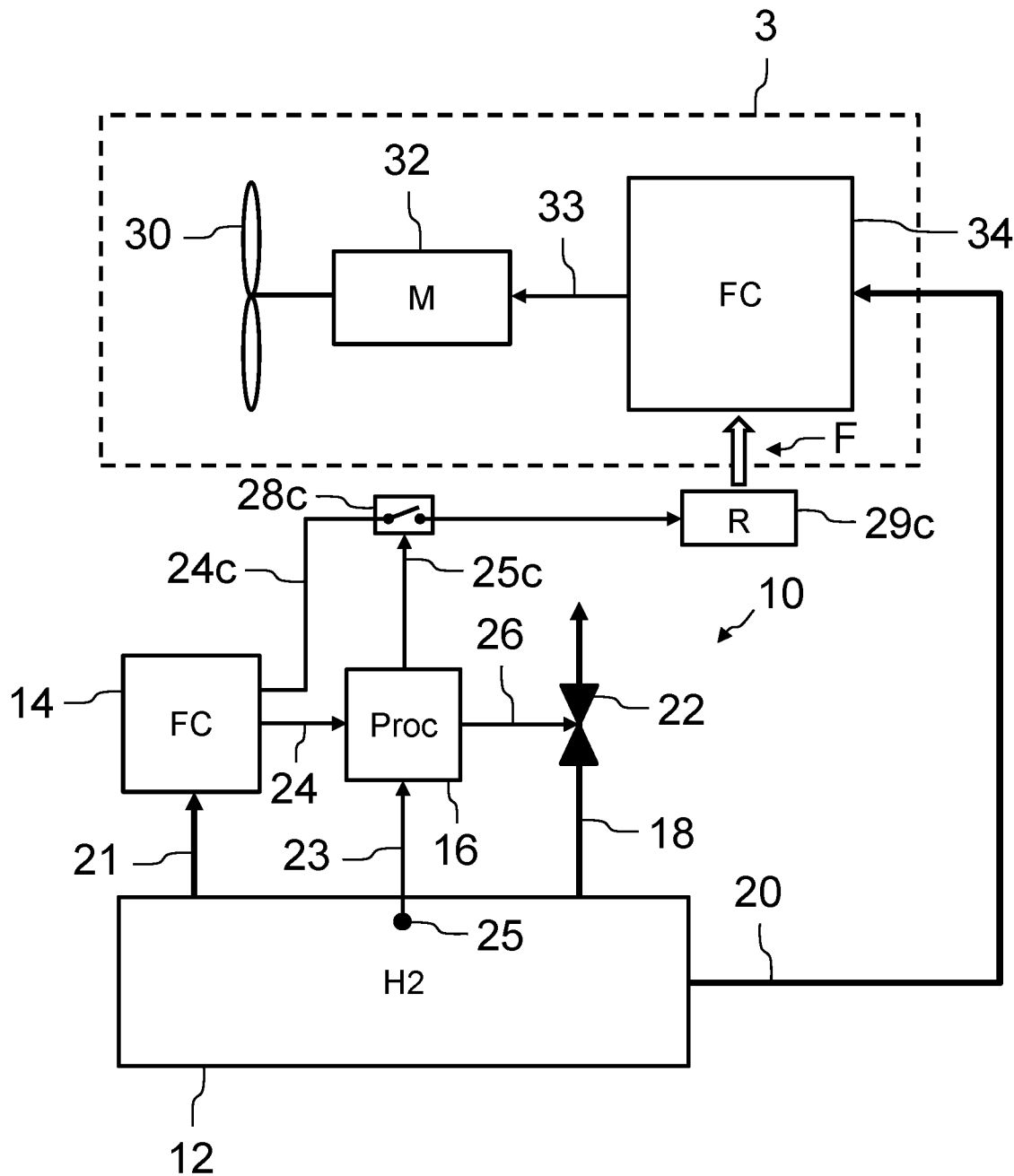
FIG. 7 schematically illustrates another particular embodiment of the hydrogen storage system connected to the aircraft propulsion system.

In a further particular manner, as illustrated in FIG. 7, the aircraft further comprises an electrical system 29c (denoted R in the figure) separate from the processing unit 16, as well as an electrical circuit configured to electrically power this electrical system via the fuel cell of the hydrogen storage system when the aircraft is parked on the ground. This electrical circuit comprises an electrical link 24c between an electrical output of the fuel cell 14 and the electrical system 29c, as well as a contactor 28c mounted in series on this electrical link. The electrical system 29c is, for example, a heating system for the fuel cell assembly 34 of the propulsion system 3, as illustrated by the arrow F in the figure. The contactor 28c is controlled, for example, by the processing unit 16 via a link 25c, so as to control the closure of the contactor when the fuel cells of the fuel cell assembly 34 have to be heated while the aircraft is parked on the ground.

In an alternative embodiment, the electrical system 29c is an electrical system outside the aircraft. The electrical link 28c then comprises an electrical socket installed on board the aircraft (for example, attached to a wall of the aircraft fuselage 2), as well as a detachable electrical cable connected between this electrical socket and the electrical system 29c when the aircraft is parked on the ground.

Figure 8:
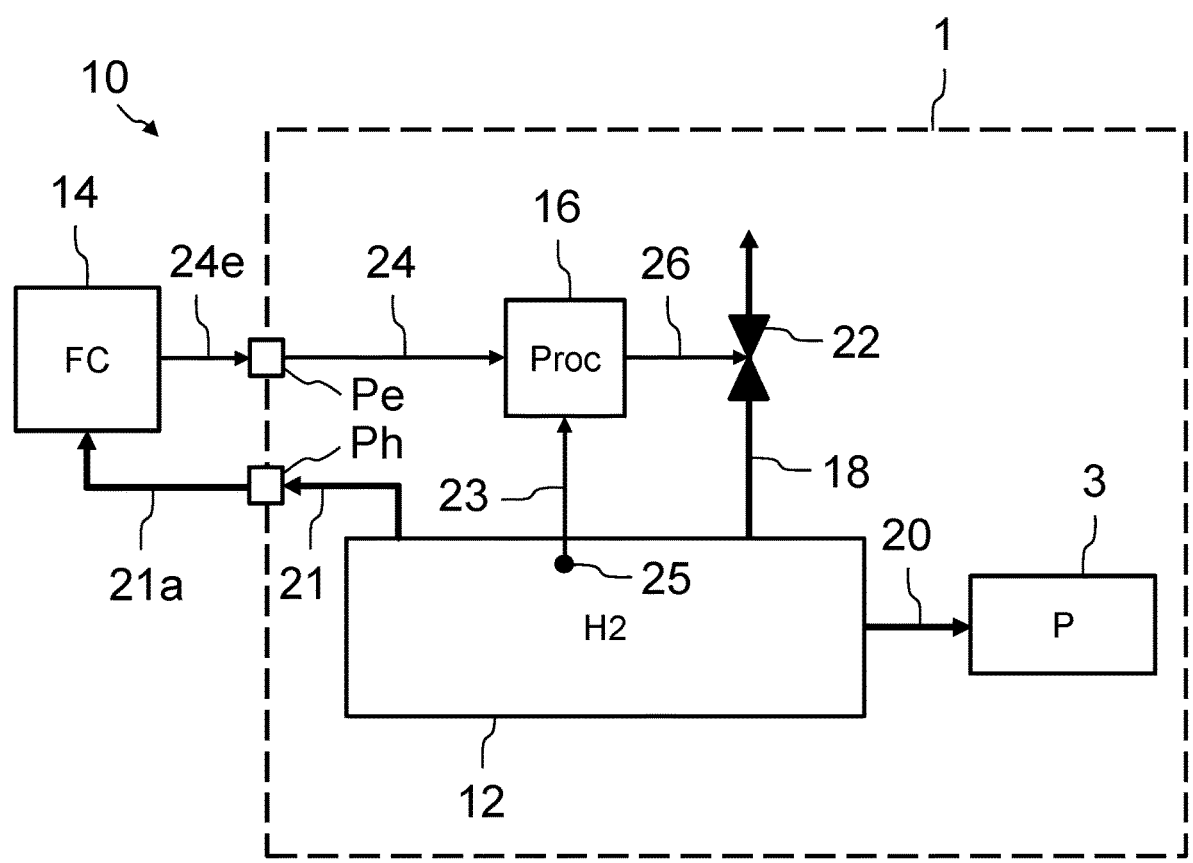
FIG. 8 schematically illustrates a particular mode of integrating a hydrogen storage system according to the invention with an aircraft.

In a particular embodiment illustrated in FIG. 8, the hydrogen storage system 10 is partially installed on board the aircraft 1. Indeed, the fuel cell 14 is then outside the aircraft, for example, installed on board a service vehicle at an airport where the aircraft is parked. An electrical socket Pe and a hydrogen pipe connector Ph are installed on board the aircraft, for example, attached to its fuselage 2. The electrical line 24 extends between the electrical socket Pe and the processing unit 16. The hydrogen pipe 21 extends between the hydrogen tank 12 and the hydrogen pipe connector Ph. When the aircraft is parked on the ground, a detachable hydrogen pipe 21a, connected to the fuel cell 14, is connected to the hydrogen pipe connector Ph and a detachable electrical cable 24e, connected to an electrical output of the fuel cell 14, is connected to the electrical socket Pe. This particular embodiment has the advantage of not having to transport the fuel cell 14 during the flight phases of the aircraft, which allows the weight of the aircraft to be reduced and thus allows the energy consumption required for its propulsion to be reduced.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. An aircraft comprising:
   a hydrogen storage system comprising a hydrogen tank and a control system for controlling hydrogen evaporation in the hydrogen tank, the control system comprising:
      a hydrogen discharge pipe connected at one end to the hydrogen tank and to a controllable valve at a second end;
      a controller configured to control the valve as a function of a pressure value in the tank, to ensure that the pressure value inside the hydrogen tank does not exceed a first predetermined pressure threshold;

a fuel cell permanently and unbrokenly fluidically coupled to the hydrogen tank separately from the hydrogen discharge pipe to permanently generate electricity even when the aircraft is parked on ground as long as hydrogen remains in the tank, wherein the controller is electrically powered by the fuel cell.

2. The aircraft according to claim 1, further comprising a propulsion system powered with energy by the hydrogen originating from the hydrogen storage system.

3. The aircraft according to claim 2, wherein the propulsion system comprises an engine operating by the combustion of hydrogen originating from the hydrogen storage system.

4. The aircraft according to claim 2, wherein the propulsion system comprises an electric motor and a fuel cell assembly supplied with hydrogen by the hydrogen storage system, the fuel cell assembly comprising an electric power supply for the electric motor.

5. The aircraft according to claim 4, wherein the fuel cell of the hydrogen storage system forms part of the fuel cell assembly electrically powering the electric motor.

6. The aircraft according to claim 4, wherein the fuel cell of the hydrogen storage system is independent of the fuel cell assembly electrically powering the electric motor.

7. The aircraft according to claim 6, further comprising an electrical circuit configured to supply electric power to the electric motor via the fuel cell of the hydrogen storage system, in addition to the electric power supply to said motor via the fuel cell assembly.

8. The aircraft according to claim 6, further comprising a non-propulsive system normally supplied with electricity by an on-board main electrical source of the aircraft, independent of the fuel cell of the hydrogen storage system and of the fuel cell assembly, and an electrical circuit configured to electrically power the non-propulsive system via the fuel cell of the hydrogen storage system in an event of a failure of the main electrical source.

9. The aircraft according to claim 4, further comprising an electrical system separate from the controller, as well as an electrical circuit configured to electrically power this electrical system via the fuel cell of the hydrogen storage system when the aircraft is parked on the ground.

10. The aircraft according to claim 9, wherein said electrical system corresponds to a system for heating at least one of the fuel cells of the fuel cell assembly.

11. The aircraft according to claim 4, further comprising an electrical circuit configured to allow an external electrical system to be connected to the aircraft when the aircraft is parked on the ground, and to electrically power this electrical system via the fuel cell of the hydrogen storage system.

* * * * *